United States Patent Office 2,944,778
Patented July 12, 1960

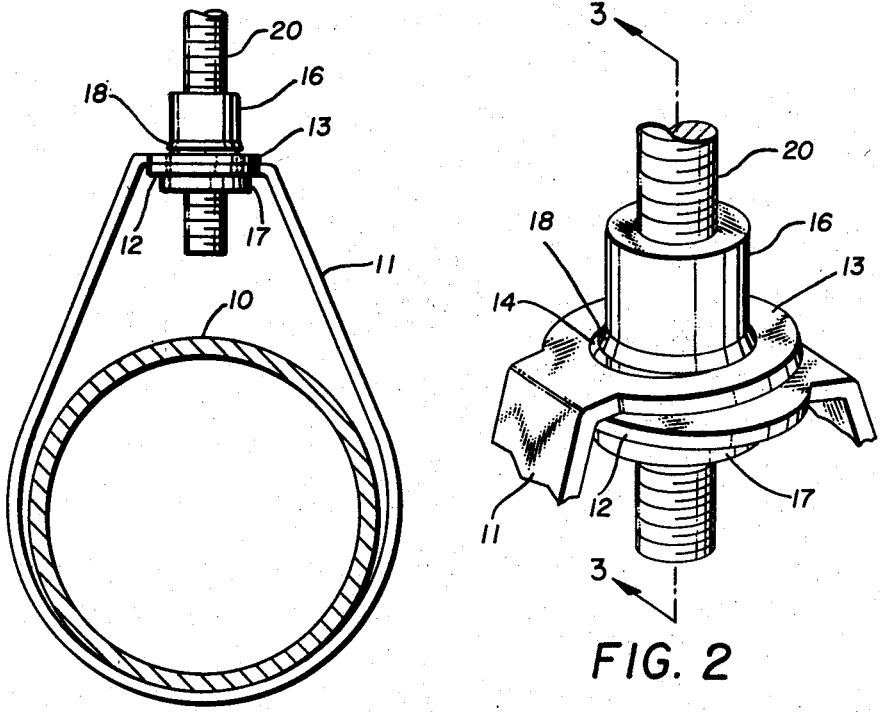
FIG. 1
FIG. 2
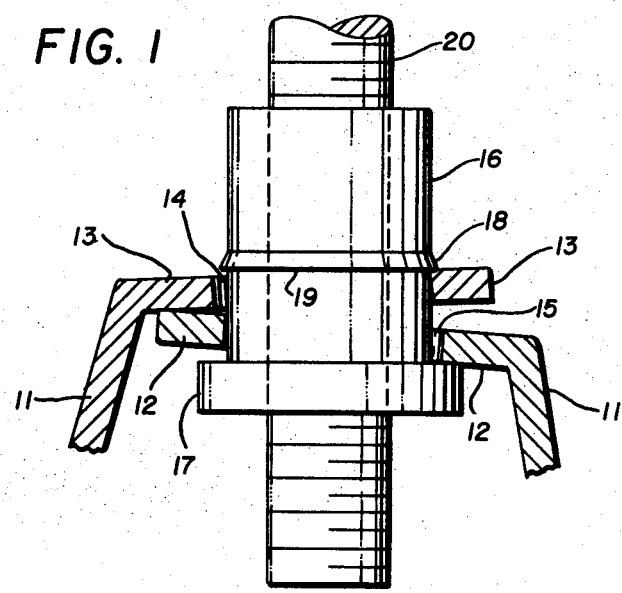
FIG. 3
INVENTOR.
WILLIAM R. KATIS
BY
*W. B. Harpman*
ATTORNEY

2,944,778

PIPE HANGER

William R. Katis, Youngstown, Ohio, assignor to "Automatic" Sprinkler Corporation of America, Youngstown, Ohio, a corporation of Delaware Filed Oct. 17, 1957, Ser. No. 690,748

5 Claims. (Cl. 248—62)

This invention relates to a device for suspending pipes and the like from overhead supports.

The principal object of the invention is the provision of a pipe hanger which may be simply formed, easily installed and which is self-retaining in assembled weight-supporting position.

A further object of the invention is the provision of a pipe hanger utilizing the deformation of the parts thereof occurring from weight suspended thereby to hold the pipe hanger in assembled relation.

A still further object of the invention is the provision of a pipe hanger that may be readily adjusted vertically or readily removed and replaced and which will support a pipe or similar object in a suitable manner.

The pipe hanger disclosed herein comprises an improvement in the art relating to devices commonly used for suspending pipes, conduits, rails, etc., from overhead supports such as ceilings, beams, joists, etc.

In the past, pipe hangers have been used which invariably required the presence of several carefully and accurately machined parts arranged for interdependent relation to maintain the assembly and desirably support the pipe.

The present invention relates to a pipe hanger which requires only a threaded support rod which may be hooked over a supporting object, a single threaded body member engaged thereon and a strap having apertured ends bent at angles to the remainder thereof and readily snapped into position over the body member and engaged on the threaded rod.

The pipe hanger disclosed herein utilizes the principle of permitting the apertured end portions to move to an angular relation with respect to the supporting member. They are engaged upon so that the effective width of the apertures in the ends thereof is reduced and the ends thereby effectively secured to the supporting member.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a plan view of the pipe hanger with parts broken away showing a section of pipe supported thereby.

Figure 2 is an enlarged detail of the pipe hanger with parts broken away and parts in cross section.

Figure 3 is a vertical section taken on line 3—3 of Figure 2 on an enlarged scale.

By referring to the drawing and Figure 1 in particular it will be seen that a pipe 10 is shown supported in a metal strap 11 having enlarged end portions 12 and 13, each of which is apertured as at 14 and 15. The enlarged ends 12 and 13 are formed at oppositely disposed angles to the adjacent portions of the metal strap 11, the angles being such that when the metal strap 11 is bent into a semicircular shape, as shown in Figure 1 of the drawing, the superimposed ends 12 and 13 are substantially parallel.

The apertured ends 12 and 13 are received by a support member 16 which comprises a cylinder having an annular outturned flange 17 about its lower end and a relatively smaller angular annular shoulder 18 inwardly from its upper and lower ends. The angular shoulder 18 is so formed that it presents a horizontal ledge 19 around its lowermost surface.

By referring to Figures 2 and 3 of the drawing it will be observed that the annular shoulder 18 forming the ledge 19 is of only slightly larger diameter than the body member 16 on which it is formed and of lesser diameter than the diameter of the apertures 14 and 15 in the ends 12 and 13 of the metal strap 11.

The body member 6 is internally threaded and adapted to be threadedly engaged on a threaded support rod 20, the upper end of which (not shown) may be formed as a hook or an eyelet so that it may be conveniently supported on an overhead supporting structure such as a ceiling or floor joist, beam, rafter, etc.

It will occur to those skilled in the art that only the lower end portion of the support rod 20 need be threaded.

In installing the pipe hanger disclosed herein, the support rod 20 is attached to the overhead supporting structure, the metal strap 11 is bent into the semi-circular shape shown in Figure 1 of the drawing as by positioning it around the pipe to be supported and the ends 12 and 13 brought into parallel relation with the apertures 14 and 15 in registry.

The body member 16 is then positioned upwardly through the apertures 15 and 14, respectively, and the body member 16 threadably engaged on the support rod 20. It will be observed that the body member 16 may be easily rotated to achieve such threaded engagement on the support rod 20 and/or to adjust it vertically thereof as long as the apertured ends 12 and 13 of the metal strap 11 are held in parallel relation which is the normal condition when the strap 11 is supporting itself.

At such time as the weight of the pipe or other object is carried by the metal strap 11, the downward deflection of the metal strap 11 will cause the deformation of the upper end portion of the apertured end portions 12 and 13 by imparting slightly oppositely disposed tilts thereto inasmuch as the apertures 14 and 15 therein are larger than the body member 16 which is engaged therethrough. Such tilting is minor but sufficient to render the effective width of the apertures 14 and 15 less than the width of the annular shoulder 18 so that the portion of the aperture lying adjacent the outermost end of the metal strap in uppermost position on the body member 16 is caused to move in under the annular shoulder 18 whereby the pipe hanger is locked in assembly and the body member 16 is held against further rotation.

To remove or replace the pipe hanger, the weight of the article supported therein is lifted therefrom, the normal resiliency of the metal strap 11 will permit the same to assume its original shape, bringing the apertures 14 and 15 back into registry, whereupon the body member 16 may be rotated downwardly and out of engagement therewith.

It will thus be seen that a simple and efficient pipe hanger structure has been disclosed which meets the several objects of the invention.

Having thus described my invention, what I claim is:

1. A pipe hanger including a metal strap having enlarged apertured end portions bent at oppositely disposed angles with respect to one another acting to place said end portions in parallel superimposed relation, a threaded support rod and a cylindrical body member threadably engaged on said support rod, said cylindrical body member having an outturned annular flange about its lower end and an annular shoulder above said outturned flange, said annular shoulder being of lesser diameter than said outturned flange, said apertured end portions of said metal strap being disposed on said cylindrical body member between said annular flange and annular shoulder, one of said apertured end portions acting to tilt when weighted to engage said shoulder and the other of said apertured end portions acting to tilt when weighted to engage said first mentioned end portion and move the same into locking engagement with said shoulder.

2. The pipe hanger set forth in claim 1 and further characterized by the diameter of the apertures in the apertured end portions being larger than the outer diameter of the annular shoulder on the cylindrical body member and of lesser diameter than the diameter of said annular flange thereon.

3. A pipe hanger comprising a support rod having a threaded end section, a cylindrical member threadably engaged on said threaded end section of said support rod, an outturned annular flange on the bottom of said cylindrical member, an annular shoulder of lesser diameter than said annular flange formed on said cylindrical member above said annular flange, the annular shoulder tapering outwardly from said cylindrical body member to define a horizontal lowermost surface on said shoulder, and a metal strap formed in a substantially circular shape, the ends of which are bent at angles to the adjacent portions thereof in oppositely disposed inturned relation and arranged in superimposed relation to one another with the apertures therein in registry with one another, said apertured inturned ends of said metal strap being positioned on said cylindrical body member and supported by said annular flange thereof, and acting when weighted to tilt in opposite directions to bring the uppermost one of said end portions into forcible engagement with said annular shoulder and the lowermost one of said portions into forcible engagement with said uppermost end portion.

4. The pipe hanger set forth in claim 3 and wherein the over-all height of the superimposed inturned end portions of the metal strap is less than the distance between said annular flange and annular shoulder on said body member whereby said inturned end portions of said metal strap act to tilt when weight is carried by said strap so as to engage said annular shoulder and said annular flange.

5. A pipe hanger comprising a support rod having a threaded end portion, a cylindrical member threadedly engaged on said end portion of the support rod, said cylindrical member including an intermediate portion having a uniform diameter, a radially projecting annular flange at the lower end of said cylindrical member, a radially projecting annular abutment flange on said cylindrical member intermediate the ends thereof, said intermediate portion of the cylindrical member extending between said flanges, the first mentioned flange being of a predetermined diameter and presenting a substantially flat upper face opposite said abutment flange, said abutment flange being of generally frusto-conical configuration presenting a tapered upper surface and a substantially flat lower surface parallel to said upper surface of the first flange and disposed perpendicular to the longitudinal axis of the cylindrical member, said abutment flange being of lesser diameter than said first flange, and a metal pipe-supporting strap of generally circular configuration having the opposite ends of the strap laterally inwardly projected and disposed in overlapping generally parallel relation, said opposite ends of the strap being provided with registerable circular apertures of a diameter intermediate those of the abutment and first flanges, said cylindrical member being projected through said apertures so that said overlapped ends embrace the intermediate portion of the cylindrical member and permitting the opposite ends of the strap to cant upwardly and engage, respectively, said flat faces of the flanges.

References Cited in the file of this patent
UNITED STATES PATENTS

| 1,109,413 | Gorham | Sept. 1, 1914 |
| 1,470,642 | Ready | Oct. 16, 1923 |
| 1,579,418 | Tomkinson | Apr. 6, 1926 |
| 1,825,842 | Zifferer | Oct. 6, 1931 |
| 1,850,275 | Zifferer | Mar. 22, 1932 |
| 2,643,079 | Pitt | June 23, 1953 |